United States Patent
Li et al.

(10) Patent No.: US 10,425,883 B2
(45) Date of Patent: Sep. 24, 2019

(54) METHOD AND NETWORK NODE FOR COORDINATION OF BEACON TRANSMISSIONS

(71) Applicant: Telefonaktiebolaget LM Ericsson (publ), Stockholm (SE)

(72) Inventors: Gen Li, Beijing (CN); Zhenshan Zhao, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 163 days.

(21) Appl. No.: 15/524,684

(22) PCT Filed: Nov. 7, 2014

(86) PCT No.: PCT/CN2014/090562
§ 371 (c)(1),
(2) Date: May 5, 2017

(87) PCT Pub. No.: WO2016/070403
PCT Pub. Date: May 12, 2016

(65) Prior Publication Data
US 2018/0310233 A1 Oct. 25, 2018

(51) Int. Cl.
*H04W 48/16* (2009.01)
*H04W 48/12* (2009.01)
(Continued)

(52) U.S. Cl.
CPC .......... *H04W 48/16* (2013.01); *H04W 48/12* (2013.01); *H04W 72/0446* (2013.01); *H04W 16/14* (2013.01)

(58) Field of Classification Search
CPC ............................. H04W 48/00; H04W 72/00
See application file for complete search history.

(56) References Cited

U.S. PATENT DOCUMENTS

2008/0259847 A1* 10/2008 Chou .................... H04W 84/18
370/328
2010/0039960 A1* 2/2010 Sugaya ............. H04W 72/1278
370/255
(Continued)

FOREIGN PATENT DOCUMENTS

CN   101129029   2/2008
CN   101589577   11/2009
(Continued)

OTHER PUBLICATIONS

PCT Notification of Transmittal of International Preliminary Report on Patentability (Chapter II of the Patent Cooperation Treaty) for International application No. PCT/CN2014/090562—dated Feb. 23, 2017.
(Continued)

*Primary Examiner* — Andrew Lai
*Assistant Examiner* — Sumitra Ganguly
(74) *Attorney, Agent, or Firm* — Patent Portfolio Builders, PLLC (57) ABSTRACT

The present disclosure provides a method (400) for coordination of beacon transmissions. The method (400) comprises, at a network node of a first network: determining (S410), for each of a plurality of candidate slots, whether the candidate slot is used by any neighboring network node of a second network for beacon transmission; selecting (S420), as a beacon slot, one of the plurality of candidate slots that is determined not to be used by any neighboring network node of the second network for beacon transmission; and transmitting (S430) a beacon in the beacon slot.

12 Claims, 4 Drawing Sheets

(51) Int. Cl.
*H04W 72/04* (2009.01)
*H04W 16/14* (2009.01)

(56) References Cited

U.S. PATENT DOCUMENTS

| | | | | |
|---|---|---|---|---|
| 2010/0085930 A1* | 4/2010 | Shin | .................. | H04W 72/1278 370/329 |
| 2010/0159936 A1* | 6/2010 | Brisebois | ............ | H04W 72/085 455/450 |
| 2010/0177720 A1* | 7/2010 | Sugaya | ............. | H04W 52/0216 370/329 |
| 2011/0158220 A1* | 6/2011 | Park | .................. | H04W 72/1257 370/345 |

FOREIGN PATENT DOCUMENTS

| | | |
|---|---|---|
| CN | 102265662 | 11/2011 |
| WO | 2005 094007 A1 | 10/2005 |
| WO | 2007 040610 A1 | 4/2007 |

OTHER PUBLICATIONS

PCT Notification of Transmittal of the International Search Report and the Written Opinion of the International Searching Authority, or the Declaration for International application No. PCT/CN2014/090562—dated Jul. 28, 2015.
EPO Supplementary European Search Report for Application No. / Patent No. 14905279.7-1854 / 3216286 PCT/CN2014090562—dated Sep. 28, 2017.

* cited by examiner

METHOD AND NETWORK NODE FOR COORDINATION OF BEACON TRANSMISSIONS

PRIORITY

This nonprovisional application is a U.S. National Stage Filing under 35 U.S.C. § 371 of International Patent Application Serial No. PCT/CN2014/090562 filed Nov. 7, 2014, and entitled "Method And Network Node For Coordination Of Beacon Transmissions."

TECHNICAL FIELD

The present disclosure relates to wireless communications, and more particularly, to a method and a network node for coordination of beacon transmissions.

BACKGROUND

In order to provide large bandwidth and high-capacity coverage, Access Nodes (ANs) in a network typically share the entire spectrum available in the network. For example, in a millimeter wave (mmW) network, a number of "high-capacity coverage islands" are deployed and the entire spectrum available in the mmW network is reused by each of these islands.

Figure 1:
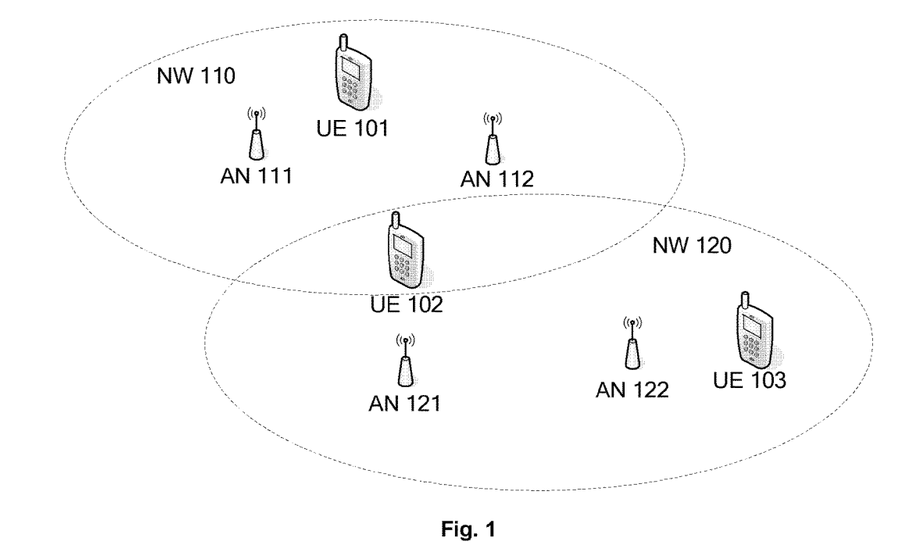
FIG. 1 is a schematic diagram showing an exemplary scenario of spectrum reuse.

FIG. 1 shows an exemplary scenario of spectrum reuse. Two networks, a network 110 and a network 120, are shown in FIG. 1. The coverage area of the network 110 and the coverage area of the network 120 partially overlap each other, as shown by the dashed lines in FIG. 1. The networks 110 and 120 may belong to different network operators and may be allocated with the same spectrum. The network 110 includes two ANs, AN 111 and AN 112, and the network 120 includes two ANs, AN 121 and AN 122. All the ANs 111, 112, 121 and 122 in FIG. 1 share the same spectrum. FIG. 1 also shows three User Equipments (UEs) 101, 102 and 103. Here, the UE 101 is served by the AN 111, the UE 102 is served by the AN 112 and the UE 103 is served by the AN 122. It can also be seen from FIG. 1 that the UE 102 is located in the overlapped area. In the following, communications between the UE 102 and the AN 112 will be described as an example, without loss of generality.

In order for the UE 102 to communicate with the AN 112, the AN 112 broadcasts beacons containing necessary information periodically within its coverage.

Figure 2:
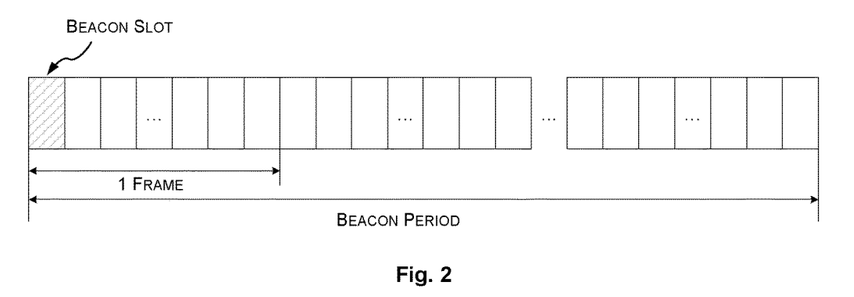
FIG. 2 is a schematic diagram showing an exemplary frame structure.

FIG. 2 shows an exemplary frame structure for communication between the UE 102 and the AN 112. The AN 112 broadcasts beacons at a beacon period, which may include a number of frames. As shown in FIG. 2, each beacon is transmitted in the first time slot (referred to as "beacon slot" hereinafter) in the first frame of the beacon period. It can be appreciated by those skilled in the art that it is illustrative only and the beacon slot can be placed at any other location as appropriate. The other slots can be used for uplink (UL) and/or downlink (DL) transmissions.

A beacon contains a sync signal sequence (such as Primary Synchronization Signal (PSS) or Secondary Synchronization Signal (SSS) in Long Term Evolution (LTE) system), a reference signal (RS) sequence and system information. The system information includes a Network Identity (NI) which globally uniquely identifies the network the AN 112 belongs to (i.e., the network 110). In this context, a "network" can be a Public Land Mobile Network (PLMN) and different "networks" are typically managed by different network operators. The system information further includes an AN Identity (AI) which uniquely identifies the AN 112 locally within the network 110. The system information further includes a Physical AN Identity (PANI) associated with physical layer functions of the AN 112. A PANI is uniquely associated with a combination of sync signal sequence and reference signal sequence (and their time and frequency locations) and such association is common among different networks.

In operation, the UE 102 detects the sync signal sequence blindly when scanning or listening to a beacon channel. When the UE 102 successfully detects the sync signal sequence, it knows the PANI from the detected sync signal sequence and thus determines the reference signal sequence based on PANI. Then, the UE 102 derives a channel estimation based on the determined reference signal sequence, and finally decodes the system information and the subsequent data transmissions based on the channel estimation.

However, since the same spectrum is reused by the network 110 and the network 120 (and thus the AN 112 and the AN 121, for example), the UE 102 also suffers from a problem of "PANI collision". There are typically a limited number of PANIs available (i.e., 504 in LTE) and thus different ANs in the same or different network(s) may have the same PANI. With cell planning, neighboring ANs of the same network can be allocated with different PANIs by the network operator. However, ANs from different networks (e.g., AN 112 and AN 121) may have the same PANI due to lack of inter-operator coordination.

Figure 3:
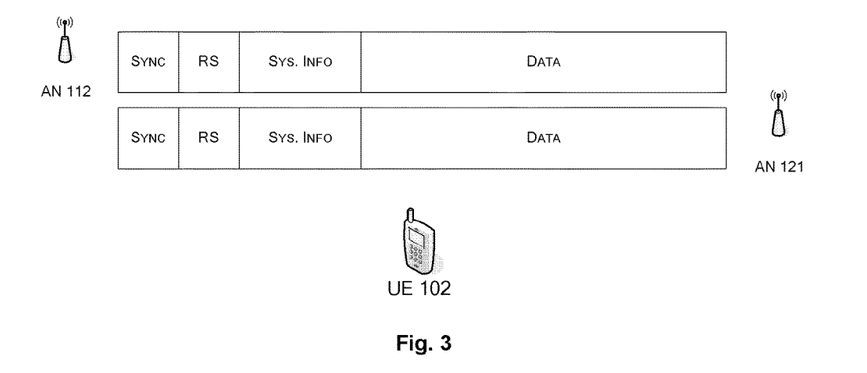
FIG. 3 is a schematic diagram showing an exemplary scenario of "PANI collision"

FIG. 3 shows an exemplary scenario of "PANI collision". The UE 102 may receive two beacons simultaneously, one from the AN 112 and the other from the AN 121 (it is assumed here that the AN 112 and the AN 121 are synchronized and thus the beacons are aligned with each other). It is assumed here that the AN 112 and the AN 121 are allocated with the same PANI. That is, the beacons from the AN 112 and the AN 121 contain the same sync signal sequence and the same reference signal sequence. The UE 102 cannot realize that it is receiving beacons from different ANs. Hence, it will successfully detect the sync signal sequence and accordingly derive a combined channel estimation of a channel between the UE 102 and the AN 112 and a channel between the UE 102 and the AN 121. With such combined channel estimation, the UE 102 cannot decode the system information in either of the beacons (hence it will never know that the beacons are transmitted from different ANs) and cannot decode any subsequent data transmission from the AN 112.

In addition to the above "PANI collision" problem, the UE 102 may also suffer from intra-frequency interference from the AN 111 and/or the AN 121. Such intra-frequency interference on the beacon transmission will result in a degraded Signal to Interference Ratio (SIR) of the beacon received at the UE, which in turn reduces the probability that the UE 102 can successfully decode the beacon and establish a connection with the AN 112.

There is thus a need for an improved solution for beacon transmission.

SUMMARY

It is an object of the present disclosure to provide a method and a network node for coordination of beacon transmissions, capable of avoiding the "PANI collision" problem and/or eliminating, or at least mitigating, intra-frequency interference on the beacon transmissions.

In a first aspect, a method for coordination of beacon transmissions is provided. The method comprises, at a network node of a first network: determining, for each of a plurality of candidate slots, whether the candidate slot is used by any neighboring network node of a second network for beacon transmission; selecting, as a beacon slot, one of the plurality of candidate slots that is determined not to be used by any neighboring network node of the second network for beacon transmission; and transmitting a beacon in the beacon slot.

In an embodiment, the method further comprises: determining, for each of the plurality of candidate slots, whether the candidate slot is used by any neighboring network node of the first network for beacon transmission.

In an embodiment, the step of selecting comprises: selecting, as the beacon slot, one of the plurality of candidate slots that is determined not to be used by any neighboring network node of the first network or the second network for beacon transmission.

In an embodiment, the step of selecting comprises: selecting, as the beacon slot, one of the plurality of candidate slots that is determined to be used by a neighboring network node of the first network for beacon transmission.

In an embodiment, the method further comprises: notifying, when it is determined that one of the plurality of candidate slots is used by both a first neighboring network node of the first network and a second neighboring network node of the second network for beacon transmission, the second neighboring network node or a control node to change the slot used by the second neighboring network node for beacon transmission.

In an embodiment, the method further comprises: transmitting data in one or more of the plurality of candidate slots that are determined not to be used by any neighboring network node of the first network or the second network for beacon transmission and are not selected as the beacon slot.

In an embodiment, the method further comprises: for each of the one or more candidate slots: blanking the data transmission in the candidate slot periodically to monitor whether it has been used by any neighboring network node of the first network or the second network for beacon transmission; and inhibiting the data transmission in the candidate slot if it has been used by a neighboring network node of the first network or the second network for beacon transmission.

In an embodiment, the determining is made by listening to a beacon channel in each of the plurality of candidate slots.

In an embodiment, each beacon includes an identifier of the candidate slot in which it is transmitted.

In an embodiment, the method further comprises: deriving, when one of the plurality of candidate slots is used by a neighboring network node of the first network or the second network for beacon transmission, a time position of each of the plurality of candidate slots based on the identifier of the one candidate slot.

In a second aspect, a network node in a first network for coordination of beacon transmissions is provided. The network node comprises: a determining unit configured to determine, for each of a plurality of candidate slots, whether the candidate slot is used by any neighboring network node of a second network for beacon transmission; a selecting unit configured to select, as a beacon slot, one of the plurality of candidate slots that is determined not to be used by any neighboring network node of the second network for beacon transmission; and a transmitting unit configured to transmit a beacon in the beacon slot.

In a third aspect, a network node in a first network for coordination of beacon transmissions is provided. The network node comprises a transceiver, a processor and a memory. The memory contains instructions executable by the processor whereby the network node is operative to: determine, for each of a plurality of candidate slots, whether the candidate slot is used by any neighboring network node of a second network for beacon transmission; select, as a beacon slot, one of the plurality of candidate slots that is determined not to be used by any neighboring network node of the second network for beacon transmission; and transmit a beacon in the beacon slot.

The above embodiments of the first aspect are also applicable for the second and third aspects.

With the embodiments of the present disclosure, a number of candidate slots are provided. A network node of a certain network can select, as its beacon slot, one of the candidate slots that is not used by any neighboring network node of another network for beacon transmission. In this way, it is possible to eliminate, or at least mitigate, intra-frequency interference from the other network on the beacon transmissions and avoid the "PANI collision" problem.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 4:
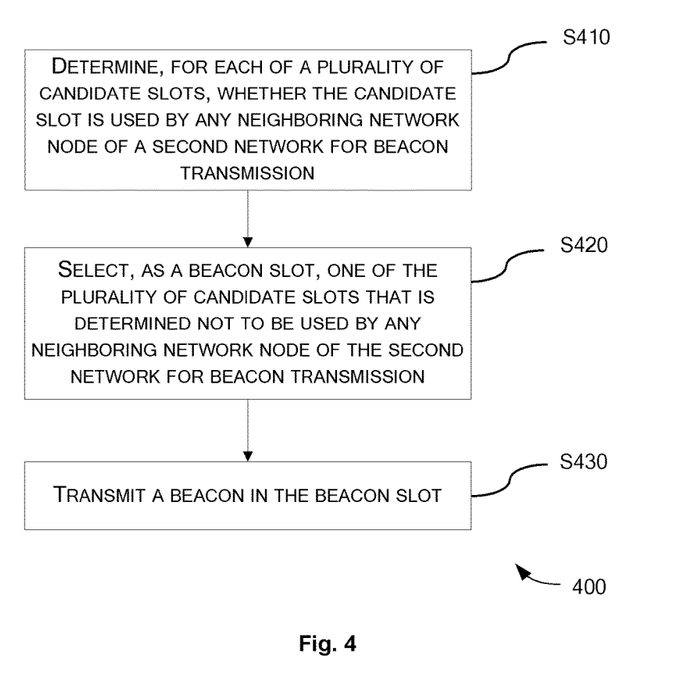
FIG. 4 is a flowchart illustrating a method for coordination of beacon transmissions according to an embodiment of the present disclosure.

FIG. 4 is a flowchart illustrating a method 400 for coordination of beacon transmissions according to an embodiment of the present disclosure. The method 400 can be performed at a network node of a first network (e.g. AN 112 of the network 110 in FIG. 1). For example, the network node can be an evolved NodeB (eNB) in an LTE network.

The method 400 includes the following steps.

At step S410, it is determined, for each of a plurality of candidate slots, whether the candidate slot is used by any neighboring network node of a second network (e.g., AN 121 of the network 120 in FIG. 1) for beacon transmission.

In the context of the present disclosure, a "neighboring" network node has a coverage area that at least partially overlaps the coverage area of the network node. In an example, the determination in the step S410 is made by listening to a beacon channel in each of the plurality of candidate slots. In this case, the network node acts like a UE for AN discovery. By listening to a beacon channel, the network node can detect one or more beacons, if any, from its neighboring network node(s) in each candidate slot.

Figure 5:
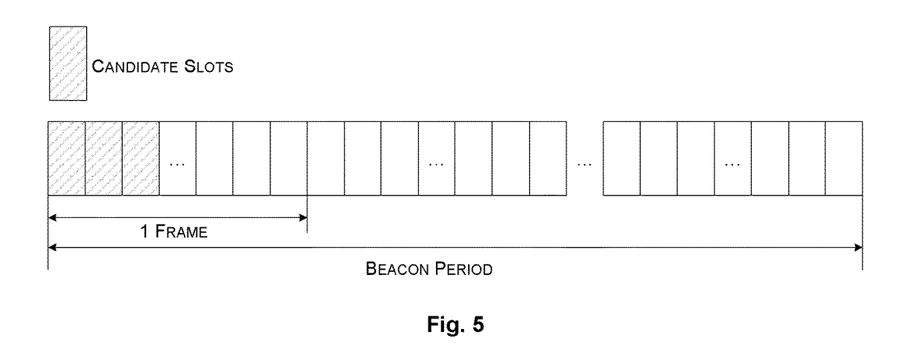
FIG. 5 is a schematic diagram showing an exemplary frame structure that can be used with the method of FIG. 4.

FIG. 5 shows an exemplary frame structure that can be used with the method 400. As shown in FIG. 5, three candidate slots are provided at the beginning of each beacon period. The time (and frequency) positions of the candidate slots are known to all network nodes of the first and second networks in advance. Here it can be appreciated by those skilled in the art that the number and positions of the candidate slots shown in FIG. 5 are illustrative only. More or less candidate slots may be provided at other time slots in the beacon period as appropriate.

In an example, each beacon includes an identifier of the candidate slot in which it is transmitted. Since the time positions of all the candidate slots are known to all network nodes of the first and second networks in advance, upon receiving a beacon from a neighboring network node of the first or second network in one of the candidate slots, the network node can derive a time position of each of the plurality of candidate slots based on the identifier of the one candidate slot, such that the network node can be synchronized with the neighboring network node.

At step S420, one of the plurality of candidate slots that is determined not to be used by any neighboring network node of the second network for beacon transmission is selected as a beacon slot.

At step S430, the beacon is transmitted in the beacon slot.

Hence, the network node can transmit its own beacon in a beacon slot that is not used by any neighboring network node of the second network for beacon transmission. In this way, the above "PANI collision" problem can be avoided since beacons from neighboring network nodes of different networks will not be transmitted in the same slot and thus can be distinguished easily by a UE. Also, the intra-frequency interference from the second network on the beacon transmission (referred to as "inter-network interference" hereinafter) can be eliminated or mitigated.

In an example, the method 400 may further include a step of determining, for each of the plurality of candidate slots, whether the candidate slot is used by any neighboring network node of the first network for beacon transmission. As discussed above in connection with the step S410, the determination can be made by listening to a beacon channel in each of the plurality of candidate slots.

In an example, in the step S420, one of the plurality of candidate slots that is determined not to be used by any neighboring network node of the first network or the second network for beacon transmission is selected as the beacon slot. In this case, in addition to the inter-network interference, the intra-frequency interference from any neighboring network node of the first network on the beacon transmission (referred to as "intra-network interference" hereinafter) can also be eliminated or mitigated.

In an alternative example, in the step S420, one of the plurality of candidate slots that is determined not to be used by any neighboring network node of the second network for beacon transmission, but to be used by a neighboring network node of the first network for beacon transmission, is selected as the beacon slot. In this case, the number of candidate slots can be reduced, which is efficient in the sense that more slots can be allocated for UL and/or DL data transmissions. It is to be noted here that, since neighboring network nodes of the same network are typically allocated with different PANIs as mentioned above, generally a UE is capable of detecting and distinguishing between different sync signal sequences even if the intra-network interference exists.

In an example, when it is determined that one of the plurality of candidate slots is used by both a first neighboring network node of the first network and a second neighboring network node of the second network for beacon transmission, the network node can notify the second neighboring network node or a control node (e.g., a centralized control functionality for controlling at least the second network) to change the slot used by the second neighboring network node for beacon transmission. In this way, it is possible to solve a "PANI collision" that may have already existed.

Preferably, the network node can transmit data in one or more of the plurality of candidate slots that are determined not to be used by any neighboring network node of the first network or the second network for beacon transmission and are not selected as the beacon slot (referred to as "unused candidate slots", although they might have been used for data transmission). In this way, while each candidate slot is primarily configured for beacon transmission, any unused candidate slot can be used for data transmission, leading to improved resource utilization. On the other hand, in order to avoid any interference the data transmission might cause to any potential beacon transmission, the data transmission in each unused candidate slot can be blanked periodically to monitor whether the slot has been used by any neighboring network node of the first network or the second network for beacon transmission. If it has been used by a neighboring network node of the first network or the second network for beacon transmission, i.e., it is no longer "unused", the data transmission in that slot can be inhibited. The period at which each unused candidate slot is blanked may vary from one unused candidate slot to another.

In the following, the above embodiments of the method 400 will be explained in further detail with reference to FIG. 6.

Figure 6:
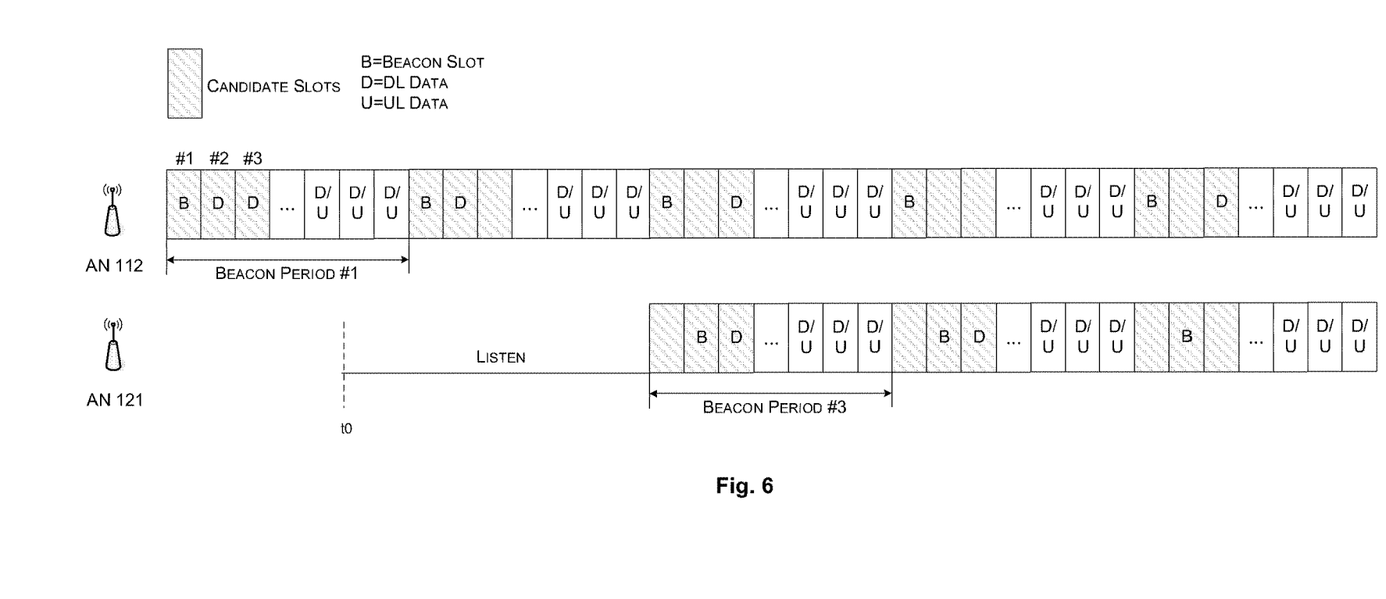
FIG. 6 is a schematic diagram showing an exemplary coordination of beacon transmissions according to an embodiment of the present disclosure.

FIG. 6 is a schematic diagram showing an exemplary coordination of beacon transmissions of two network nodes (e.g., AN 112 and AN 121 in FIG. 1). In the example shown in FIG. 6, each beacon period includes three candidate slots (the hatched slots, labeled as #1, #2 and #3) and a number of other slots for DL or UL data transmission. As shown, the AN 112 uses the candidate slot #1 as its beacon slot, labeled as "B" in the first line. Assuming that initially the AN 112 does not detect any neighbor, it considers the candidate slots #1 and #2 to be "unused" and uses them for DL data transmission, as indicated by the label "D" in the first line.

At time t0, the AN 121 is activated and starts listening to the beacon channel for at least one beacon period (the second beacon period). In this case, the AN 121 detects the beacon from the AN 112 in the candidate slot #1 and determines that the candidate slot #1 has been used by the AN 112 (from the NI and AI included in the beacon). Hence, the AN 121 selects the candidate slot #2 as its beacon slot and considers the candidate slot #3 as "unused".

In the second beacon period, the AN 112 blanks its data transmission in the candidate slot #3 to monitor whether the candidate slot #3 has been used by any neighboring node for beacon transmission. In this case, the candidate slot #3 has not been used by any neighboring node for beacon transmission in the second beacon period.

In the third beacon period, the AN 112 and the AN 121 use the candidate slots #1 and #2 for their beacon transmissions, respectively. Further, the AN 112 and the AN 121 both use the candidate slot #3 for data transmission. Here, the AN 112 blanks its data transmission in the candidate slot #2 to monitor whether the candidate slot #2 has been used by any neighboring node for beacon transmission. The blanking operations in the candidate slots #2 and #3 are carried out alternately. In this case, the AN 112 determines that the candidate slot #2 has used by the AN 121 for beacon transmission.

In the fourth beacon period, the AN 112 and the AN 121 still use the candidate slots #1 and #2 for their beacon transmissions, respectively. The AN 121 uses the candidate slot #3 for data transmission. The AN 112 inhibits its data transmission in the candidate slot #2 as it is no longer "unused". The AN 112 blanks its data transmission in the candidate slot #3 to monitor whether the candidate slot #3 has been used by any neighboring node for beacon transmission. In this case, the candidate slot #3 has not been used by any neighboring node for beacon transmission in the fourth beacon period.

In the fifth beacon period, the AN 112 and the AN 121 still use the candidate slots #1 and #2 for their beacon transmissions, respectively. The AN 112 uses the candidate slot #3 for data transmission, while the AN 121 blanks its data transmission in the candidate slot #3 to monitor whether the candidate slot #3 has been used by any neighboring node for beacon transmission. The operations of the AN 112 and the AN 121 in subsequent beacon periods will be omitted here for simplicity.

Figure 7:
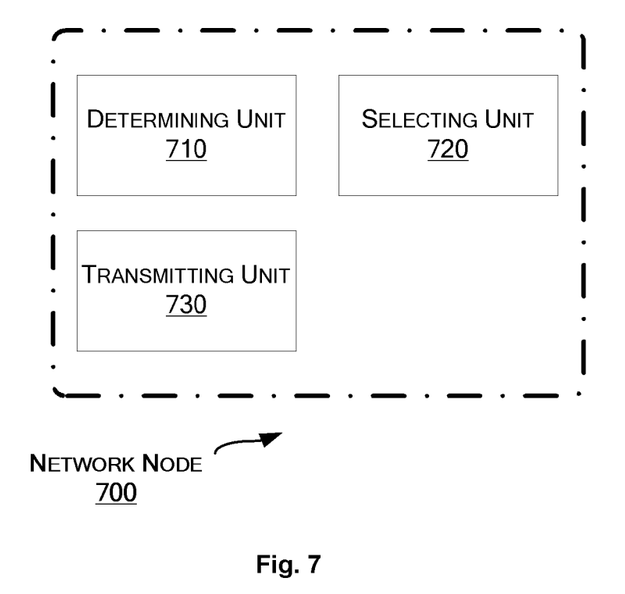
FIG. 7 is a block diagram of a network node for coordination of beacon transmissions according to an embodiment of the present disclosure.

Correspondingly to the method 400 as described above, a network node in a first network for coordination of beacon transmissions is provided. FIG. 7 is a block diagram of a network node 700 for coordination of beacon transmissions according to an embodiment of the present disclosure. The network node 700 can be an AN (e.g., an eNB) in a first network.

As shown in FIG. 7, the network node 700 includes a determining unit 710 configured to determine, for each of a plurality of candidate slots, whether the candidate slot is used by any neighboring network node of a second network for beacon transmission. The network node 700 further includes a selecting unit 720 configured to select, as a beacon slot, one of the plurality of candidate slots that is determined not to be used by any neighboring network node of the second network for beacon transmission. The network node 700 further includes a transmitting unit 730 configured to transmit a beacon in the beacon slot.

In an embodiment, the determining unit 710 is further configured to determine, for each of the plurality of candidate slots, whether the candidate slot is used by any neighboring network node of the first network for beacon transmission.

In an embodiment, the selecting unit 720 is further configured to select, as the beacon slot, one of the plurality of candidate slots that is determined not to be used by any neighboring network node of the first network or the second network for beacon transmission.

In an embodiment, the selecting unit 720 is further configured to select, as the beacon slot, one of the plurality of candidate slots that is determined to be used by a neighboring network node of the first network for beacon transmission.

In an embodiment, the transmitting unit 730 is further configured to notify, when it is determined that one of the plurality of candidate slots is used by both a first neighboring network node of the first network and a second neighboring network node of the second network for beacon transmission, the second neighboring network node or a control node to change the slot used by the second neighboring network node for beacon transmission.

In an embodiment, the transmitting unit 730 is further configured to transmit data in one or more of the plurality of candidate slots that are determined not to be used by any neighboring network node of the first network or the second network for beacon transmission and are not selected as the beacon slot.

In an embodiment, the transmitting unit 730 is further configured to blank the data transmission in the candidate slot periodically to monitor whether it has been used by any neighboring network node of the first network or the second network for beacon transmission and inhibit the data transmission in the candidate slot if it has been used by a neighboring network node of the first network or the second network for beacon transmission.

In an embodiment, the determining unit 710 is configured to determine, for each of the plurality of candidate slots, whether the candidate slot is used by any neighboring network node of the first network or the second network for beacon transmission by listening to a beacon channel in the candidate slot.

In an embodiment, each beacon includes an identifier of the candidate slot in which it is transmitted.

In an embodiment, the network node 700 further includes a deriving unit (not shown) configured to derive, when one of the plurality of candidate slots is used by a neighboring network node of the first network or the second network for beacon transmission, a time position of each of the plurality of candidate slots based on the identifier of the one candidate slot.

Each of the units 710-730 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4.

Figure 8:
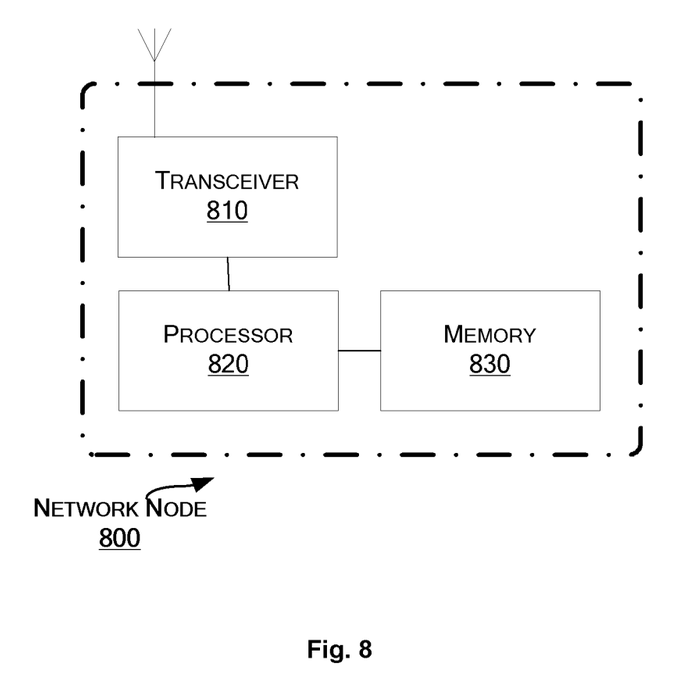
FIG. 8 is a block diagram of a network node for coordination of beacon transmissions according to another embodiment of the present disclosure.

FIG. 8 is a block diagram of a network node 800 in a first network for coordination of beacon transmissions according to another embodiment of the present disclosure.

The network node 800 includes a transceiver 810, a processor 820 and a memory 830. The memory 830 contains instructions executable by the processor 820 whereby the network node 800 is operative to: determine, for each of a plurality of candidate slots, whether the candidate slot is used by any neighboring network node of a second network for beacon transmission; select, as a beacon slot, one of the plurality of candidate slots that is determined not to be used by any neighboring network node of the second network for beacon transmission; and transmit a beacon in the beacon slot.

In an embodiment, the memory 830 further contains instructions executable by the processor 820 whereby the network node 800 is operative to: determine, for each of the plurality of candidate slots, whether the candidate slot is used by any neighboring network node of the first network for beacon transmission.

In an embodiment, the selecting comprises: selecting, as the beacon slot, one of the plurality of candidate slots that is determined not to be used by any neighboring network node of the first network or the second network for beacon transmission.

In an embodiment, the selecting comprises: selecting, as the beacon slot, one of the plurality of candidate slots that is determined to be used by a neighboring network node of the first network for beacon transmission.

In an embodiment, the memory 830 further contains instructions executable by said processor 820 whereby the network node 800 is operative to: notify, when it is determined that one of the plurality of candidate slots is used by both a first neighboring network node of the first network and a second neighboring network node of the second network for beacon transmission, the second neighboring network node or a control node to change the slot used by the second neighboring network node for beacon transmission.

In an embodiment, the memory 830 further contains instructions executable by said processor 820 whereby the network node 800 is operative to: transmit data in one or more of the plurality of candidate slots that are determined not to be used by any neighboring network node of the first network or the second network for beacon transmission and are not selected as the beacon slot.

In an embodiment, the memory 830 further contains instructions executable by said processor 820 whereby the network node 800 is operative to: for each of the one or more candidate slots: blank the data transmission in the candidate slot periodically to monitor whether it has been used by any neighboring network node of the first network or the second network for beacon transmission; and inhibit the data transmission in the candidate slot if it has been used by a neighboring network node of the first network or the second network for beacon transmission.

In an embodiment, the determining is made by listening to a beacon channel in each of the plurality of candidate slots.

In an embodiment, each beacon includes an identifier of the candidate slot in which it is transmitted.

In an embodiment, the memory 830 further contains instructions executable by said processor 820 whereby the network node 800 is operative to: derive, when one of the plurality of candidate slots is used by a neighboring network node of the first network or the second network for beacon transmission, a time position of each of the plurality of candidate slots based on the identifier of the one candidate slot.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 820 causes the network node 800 to perform the actions, e.g., of the procedure described earlier in conjunction with FIG. 4.

The computer program product may be configured as a computer program code structured in computer program modules. The computer program modules could essentially perform the actions of the flow illustrated in FIG. 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for coordination of beacon transmissions, the method comprising, at a network node of a first network:
   determining, for each of a plurality of candidate slots, whether a candidate slot is used by any neighboring network node of a second network for beacon transmission;
   determining, for each of the plurality of candidate slots, whether the candidate slot is used by any neighboring network node of the first network for the beacon transmission;
   selecting, as a beacon slot, one of the plurality of candidate slots that is determined not to be used by any neighboring network node of the first network or the second network for the beacon transmission;
   transmitting a beacon in the beacon slot; and
   transmitting data in one or more of the plurality of candidate slots in a beacon period, wherein the one or more of the plurality of candidate slots are determined not to be used by any neighboring network node of the first network or the second network for the beacon transmission and are not selected as the beacon slot.

2. The method of claim 1, further comprising:
   notifying, when it is determined that one of the plurality of candidate slots is used by both a first neighboring network node of the first network and a second neighboring network node of the second network for the beacon transmission, the second neighboring network node or a control node to change the determined candidate slot used by the second neighboring network node for the beacon transmission.

3. The method of claim 1, further comprising, for each of the one or more of the plurality of candidate slots:
   blanking the data transmission in a candidate slot, of the one or more of the plurality of candidate slots, periodically to monitor whether the candidate slot, of the one or more of the plurality of candidate slots, has been used by any neighboring network node of the first network or the second network for the beacon transmission; and
   inhibiting the data transmission in the candidate slot, of the one or more of the plurality of candidate slots, if the candidate slot, of the one or more of the plurality of candidate slots, has been used by a neighboring network node of the first network or the second network for the beacon transmission.

4. The method of claim 1, wherein said determining is made by listening to a beacon channel in each of the plurality of candidate slots.

5. The method of claim 1, wherein each beacon includes an identifier of the candidate slot in which respective beacon is transmitted.

6. The method of claim 5, further comprising:
   deriving, when one of the plurality of candidate slots is used by a neighboring network node of the first network or the second network for the beacon transmission, a time position of each of the plurality of candidate slots based on the identifier of the one of the plurality of candidate slots.

7. A network node in a first network for coordination of beacon transmissions, comprising a transceiver, a processor, and a memory, said memory containing instructions executable by said processor, whereby the network node is operative to:
   determine, for each of a plurality of candidate slots, whether a candidate slot is used by any neighboring network node of a second network for beacon transmission;
   determine, for each of the plurality of candidate slots, whether the candidate slot is used by any neighboring network node of the first network for the beacon transmission;
   select, as a beacon slot, one of the plurality of candidate slots that is determined not to be used by any neighboring network node of the first network or the second network for the beacon transmission;
   transmit a beacon in the beacon slot; and
   transmit data in one or more of the plurality of candidate slots in a beacon period, wherein the one or more of the plurality of candidate slots are determined not to be used by any neighboring network node of the first network or the second network for the beacon transmission and are not selected as the beacon slot.

8. The network node of claim 7, wherein said memory further contains instructions executable by said processor whereby the network node is operative to:
   notify, when it is determined that one of the plurality of candidate slots is used by both a first neighboring network node of the first network and a second neighboring network node of the second network for the beacon transmission, the second neighboring network node or a control node to change the determined candidate slot used by the second neighboring network node for the beacon transmission.

9. The network node of claim 7, wherein said memory further contains instructions executable by said processor whereby the network node is operative to:
   for each of the one or more of the plurality of candidate slots:
      blank the data transmission in a candidate slot, of the one or more of the plurality of candidate slots, periodically to monitor whether the candidate slot, of the one or more of the plurality of candidate slots, has been used by any neighboring network node of the first network or the second network for the beacon transmission; and
      inhibit the data transmission in the candidate slot, of the one or more of the plurality of candidate slots, if the candidate slot, of the one or more of the plurality of candidate slots, has been used by a neighboring network node of the first network or the second network for the beacon transmission.

10. The network node of claim 7, wherein said determination is made by listening to a beacon channel in each of the plurality of candidate slots.

11. The network node of claim 7, wherein each beacon includes an identifier of the candidate slot in which respective beacon is transmitted.

12. The network node of claim 11, wherein said memory further contains instructions executable by said processor, whereby the network node is operative to:
   derive, when one of the plurality of candidate slots is used by a neighboring network node of the first network or the second network for the beacon transmission, a time position of each of the plurality of candidate slots based on the identifier of the one of the plurality of candidate slots.

* * * * *